United States Patent [15] 3,673,280
Minton et al. [45] June 27, 1972

[54] ELASTOMERIC MATERIALS AND PROCESS THEREFOR

[72] Inventors: Robert G. Minton, Levittown; Sidney Melamed, Elkins Park, both of Pa.

[73] Assignee: Rohm and Haas Company, Philadelphia, Pa.

[22] Filed: June 14, 1967

[21] Appl. No.: 655,707

Related U.S. Application Data

[63] Continuation-in-part of Ser. No. 372,476, June 4, 1964, abandoned.

[52] U.S. Cl. ................260/878 R, 260/23 AR, 260/41 C, 260/78.5 B, 260/80.72, 260/80.73, 260/80.75, 260/80.76, 260/80.8, 260/85.5 ES, 260/86.1 R, 260/86.1 N, 260/86.1 E, 260/92.8 R, 260/92.8 W, 260/884, 260/885, 260/DIG. 23, 117/132 R, 117/139.5 A, 117/142, 117/155 UA, 117/148, 264/184, 264/282, 264/290 R
[51] Int. Cl. .........................................C08f 15/00
[58] Field of Search ...........................260/878, 897 C, 884

[56] References Cited

UNITED STATES PATENTS

| | | | |
|---|---|---|---|
| 3,019,208 | 1/1962 | Reid et al. | 260/45.5 |
| 3,062,778 | 11/1962 | Van Cleve et al. | 260/45.5 |
| 3,277,042 | 10/1966 | Richart | 260/31.8 |
| 3,356,627 | 12/1967 | Scott | 260/29.6 |
| 3,468,976 | 9/1969 | Yanai et al. | 260/883 |
| 3,334,156 | 4/1967 | Calentine et al. | 260/884 |

FOREIGN PATENTS OR APPLICATIONS

| | | |
|---|---|---|
| 1,116,403 | 11/1961 | Germany |
| 1,164,080 | 9/1964 | Germany |
| 824,263 | 11/1959 | Great Britain |
| 831,881 | 4/1960 | Great Britain |
| 950,055 | 2/1964 | Great Britain |

Primary Examiner—Joseph L. Schofer
Assistant Examiner—Stanford M. Levin
Attorney—George W. F. Simmons and Carl A. Castellan

[57] ABSTRACT

Elastomeric materials and methods of producing them comprising:

A. About 50–90 percent by weight of a base elastomeric composition as a "backbone" or main component formed by copolymerizing a mixture comprising
 1. about 75–99.9 percent by weight of the base composition of at least one monomer polymerizable to give a rubbery polymer and selected from the group consisting of alkyl ($C_2$–$C_8$) acrylates, and mixtures thereof with each other and with up to an equal weight amount of ethylene, propylene, or isobutylene; and
 2. at least about 0.1 percent by weight of the base composition of at least one ethylenically unsaturated monomer copolymerizable with (A)(1) and containing at least one radical effective to crosslink said base composition by a reaction which is activated separately from the polymerization reaction; and B. About 50–10 percent by weight of a reinforcing material for the base composition and dispersed throughout the base composition consisting of a polymer of
 1. at least one halogen monomer selected from the group consisting of vinylidene chloride, vinylidene fluoride, vinylidene fluorochloride, vinyl chloride and vinyl fluoride; and
 2. up to about 6 percent by weight of the mixture of at least one α,β-monoethylenically unsaturated monomer copolymerizable with (B)(1).

The backbone is crosslinked by virtue of the reaction of the radicals in monomer (A)(2) to make the backbone solvent insoluble. The backbone may optionally contain a diluent and/or a hardener, the latter being a monomer effective to raise the glass transition temperature of the copolymer. Preferably, the elastomers are spun into fibers or extruded into films.

23 Claims, 1 Drawing Figure

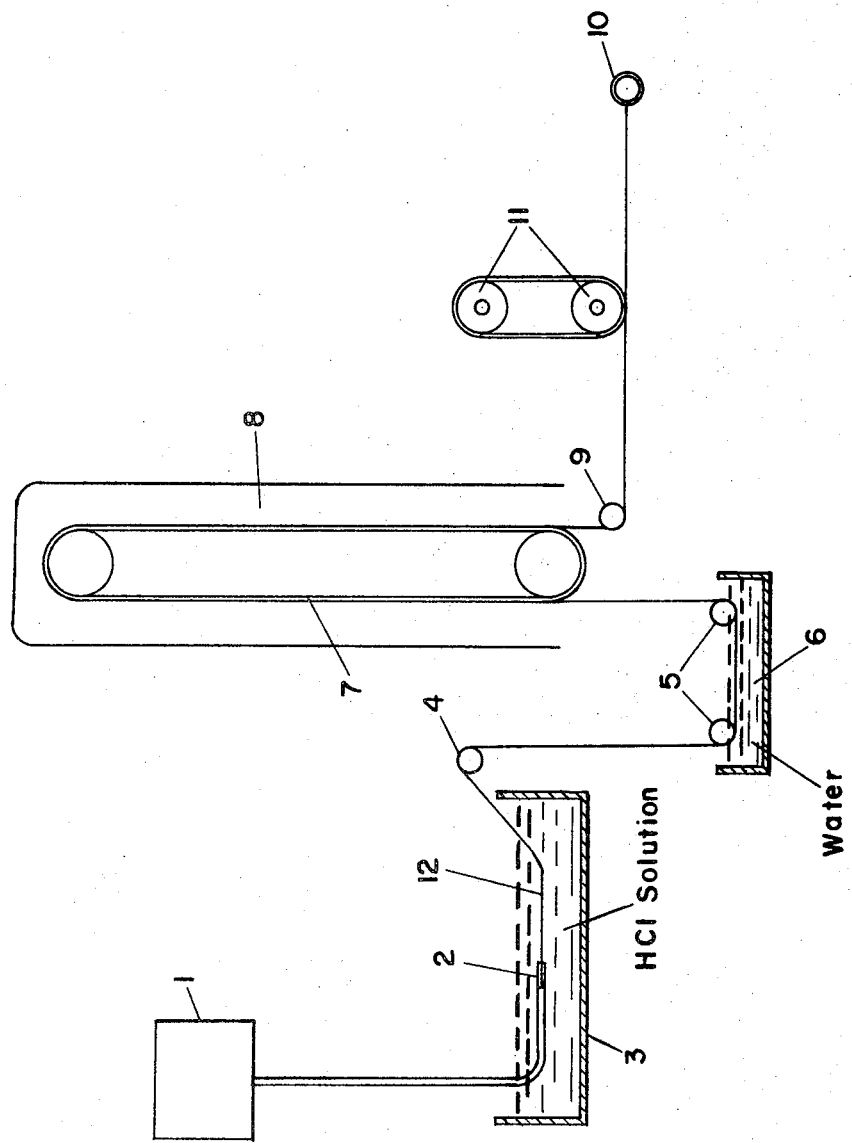

ELASTOMERIC MATERIALS AND PROCESS THEREFOR

This application is a continuation-in-part of Ser. No. 372,476 filed June 4, 1964. now abandoned This invention relates to novel elastomeric materials; to shaped structures, i.e., films and threads, prepared therefrom; and to the method of preparing such materials and the shaped products thereof.

For some time, there has been an extensive search to develop materials having the elasticity of rubber combined with the high modulus, tensile strength and other properties needed to produce a high quality elastic thread. More recently, the development of spandex materials has resulted in a variety of commercial products offering many advantages compared to natural rubber threads. Spandex materials also suffer from a number of defects. At the present time, there is a need for an elastic material which will approach the high tensile, high return modulus and low set characteristics typical of the spandex materials while at the same time offering superior resistance to ultraviolet, aging, chlorine, organic solvents, etc., combined with improved dyeability.

A number of elastic polymers are known based upon various acrylic and vinyl monomers. While some of the elastic polymers derived from such materials have improved solvent resistance, dyeability, aging characteristics and resistance to ultraviolet compared to the spandex fibers, to date polymers prepared from such materials have been highly inadequate in regard to the essential properties of tensile strength, return modulus and set characteristics.

Accordingly, it is an object of the invention to produce elastomeric materials of alkyl acrylates and monoethylenically unsaturated halides.

Another object of the invention is to produce films and fibers of an elastomeric material which may be cleaned by standard laundry methods as dry cleaning or washing using detergents and chlorine bleaches.

A further object of the invention is to produce elastic fibers and films which have high return modulus, high tensile strength and low set characteristics, combined with outstanding resistance to ultraviolet, solvents, aging and action of chemicals, such as bleaches (both chlorine and peroxide).

Still another object is to provide elastomeric fibers and films having improved color stability and dyeability.

Again, an object of the invention is to produce elastomeric materials of alkyl acrylates and monoethylenically unsaturated halides useful as protective coating, as a gasket material, foam, etc.

It has now been found that these and other objects of the invention can be achieved by means of a synthetic elastomeric material comprising:

A. About 50–90 percent by weight of a base elastomeric composition as a "backbone" or main component formed by copolymerizing a mixture comprising
  1. about 75–99.9 percent by weight of the base composition of at least one monomer polymerizable to give a rubbery polymer and selected from the group consisting of alkyl ($C_2$–$C_8$) acrylates, and mixtures thereof with each other and with up to an equal weight amount of ethylene, propylene, or isobutylene; and
  2. at least about 0.1 percent by weight of the base composition of at least one ethylenically unsaturated monomer copolymerizable with (A) (1) and containing at least one radical effective to crosslink said base composition by a reaction which is activated separately from the polymerization reaction; and B. About 50–10 percent by weight of a reinforcing material for the base composition and dispersed throughout the base composition consisting of a polymer of
  1. at least one halogen monomer selected from the group consisting of vinylidene chloride, vinylidene fluoride, vinylidene fluorochloride, vinyl chloride and vinyl fluoride; and
  2. up to about 6 percent by weight of the mixture of at least one $\alpha,\beta$-monoethylenically unsaturated monomer copolymerizable with (B) (1).

The backbone is crosslinked by virtue of the reaction of the radicals in monomer (A) (2) to make the backbone solvent insoluble. The expression "monomer polymerizable to give a rubbery polymer" is used to exclude those alkyl acrylates such as tert-butyl acrylate which polymerize to hard, non-elastomeric polymers. The preferred alkyl acrylates, particularly for fibers and films, are ethyl, n-propyl, i-propyl, i-butyl and n-butyl acrylate. Where the elastomeric material is to be used in foams or molded or cast goods, the higher alkyl acrylates as 2-ethylhexyl acrylate are useful.

Of the reinforcing materials, vinylidene chloride has been found to be unique in the extent and nature of its reinforcing action. It is believed that this is due to its unusual combination of high crystallinity with very low glass temperature. Moreover, the melting point of polyvinylidene chloride is such that the crystalline polymer particles may be melted and recrystallized within the crosslinked, rubbery backbone without damaging the backbone.

To facilitate the description of the invention, all parts and percentages in the specification are by weight unless otherwise stated. The elastomeric materials of the invention are characterized by good compression set and tensile strength while the preferred materials used for fibers and films are characterized by good modulus, elongation and running set. All the compositions of the invention are resistant to chlorine bleaches and have good light stability. The preferred materials, particularly for use in fibers, comprise from 60–80 percent of the backbone and, correspondingly, from 40–20 percent of the reinforcing material; the rubbery monomer(s) constitute from 85–99.9 percent of the backbone; the rubbery monomer is as above either alone or with 25–40 percent of ethylene; and the halogen monomer is vinylidene chloride.

The elastomeric materials of the invention are prepared from an aqueous dispersion of a mixture of the base composition and of the reinforcing material by coagulating the dispersion. In one embodiment, such a mixture is prepared mechanically by physical admixture of separate dispersions of the base composition and of the reinforcing material. It is preferred to prepare the synthetic elastomeric material by a sequential polymerization in which a mixture of the monomers used in preparing the reinforcing material is polymerized in an aqueous dispersion of the base composition, thus forming a "chemical mixture".

If desired, successive polymerizations may be carried out on the same dispersion. Thus, if desired, after preparation of the latex mixture by sequential polymerization or physical admixture as described, a fresh portion of the monomers in A may be polymerized on the latex followed, if desired, by a fresh portion of the monomers of B. In such successive polymerizations, the conditions may be varied so as to produce different molecular weight products as, for example, an A phase of intermediate molecular weight and an A' phase having the same monomeric content but having a very high molecular weight. In addition to carrying out such successive polymerizations utilizing the monomers embraced in A and B, other monomers may be polymerized on the latex in a subsequent (i.e., tertiary or later) polymerization in addition to, or in place of, such monomers to impart specific properties thereto. Thus, a monomer or monomers containing hydroxyl, sulfonic, carboxyl, amino, ureido or other functional groups may be polymerized thereon to impart dyeability or other specific properties without departing from the scope of the invention.

In the case of the sequential copolymers, it is believed that some type of chemical bonding occurs between the backbone and the monomers subsequently polymerized thereon. The precise nature of the reactions occurring in the sequential polymerization used in producing the novel copolymers of the invention is not known. Thus, the sequentially polymerized mixture of monomers may be linked to the backbone copolymers by grafting or layering or it may form a block copolymer therewith. A significant advantage of the sequential polymers is that the fibers produced therefrom are transparent with good clarity.

BACKBONE

The backbone is responsible for the elasticity of the polymeric products of the invention. The backbone comprises a predominant amount of one or more "rubbery monomers", a very small amount of a crosslinker and, optionally, either a hardener or a diluent or both. The amounts, nature and function of each of these materials is discussed hereinafter. The term "rubbery monomer" is somewhat inapposite as applied to monomers in that it is the polymer which is rubbery. However, with this qualification the term "rubbery monomer" is used herein to designate those monomer or monomers responsible for the elasticity, that is, the rubberiness of the final product. The rubbery monomers used in the instant invention are alkyl esters of acrylic acid having from two to eight carbon atoms in the alkyl group or mixtures of one or more of such esters with each other or with up to an equal weight amount of ethylene, propylene and/or isobutylene, which monomer or monomer mixtures produce a rubbery, non-crystalline polymer or copolymer. The rubbery monomer constitutes from 75–99.9 percent of the backbone and preferably from 85–99.9 percent. The backbone itself constitutes from 50–90 percent of the entire polymeric composition and preferably from 60–80 percent.

DILUENT

If desired, a small portion of the rubbery monomer may be replaced by a suitable monomer copolymerizable therewith and which does not interfere with the elasticity thereof. Generally, such monomers are themselves acrylates or methacrylates whose homopolymers display some elasticity. Thus, if desired, a minor amount, say about 5 percent of the principal alkyl acrylate, may be replaced with methyl acrylate or 2-ethylhexyl methacrylate, etc. without departing from the invention. Such monomers act as diluents.

HARDENER

Optionally, the backbone copolymer contains one or more $\alpha,\beta$-monoethylenically unsaturated monomers, which monomers are effective to increase the glass transition temperature of the copolymer. (For the method of determining the glass transition temperature of a polymer, see D. G. Bannerman and E. E. Magat, page 288 in Polymer Processes, C. E. Schildknecht, ed., Interscience Publishers Inc., 1956). Monomers having this effect on the copolymer are termed "hardeners". Any monomer whose homopolymer is hard and non-elastic at 50° C. may be used. Thus, those monomers are included whose homopolymers are highly crystalline and possess a high melting point, such as polyvinylidene chloride, and also those monomers whose homopolymers possess a high glass transition temperature. Suitable hardeners include vinylidene chloride, vinyl chloride, acrylonitrile, vinyl pyridine, methacrylonitrile, methyl methacrylate, styrene, vinyl toluene, ethyl methacrylate, acrylic acid, methacrylic acid and itaconic acid. The preferred hardener is acrylonitrile. In the preferred compositions of the invention used as fibers it has been found that acrylonitrile not only "hardens" the copolymer (i.e., increases the glass transition temperature), but also "toughens" the copolymer (i.e., increases ultimate tenacity and ultimate elongation).

Some of the monomers useful as crosslinkers are also effective as hardeners. Where a crosslinker is used as a hardener, it must be one which requires a separate activator for its crosslinking action. According to one embodiment of the invention, such monomers are used in preparing the backbone copolymers in amounts greatly in excess of that needed to achieve crosslinking. The crosslinking reaction is then controlled so that only a portion of the available crosslinking monomer units are utilized for such crosslinking, the portion of the monomer units not utilized in the crosslinking being retained in the polymer to function as a hardener. In addition to acting as hardeners such residual monomer units may also improve dyeing and, in some cases, increase the stability of the resulting sequential copolymers. Further, where the novel latex of the invention is used in a coating composition, such monomer units may improve the adhesion of the coatings to a variety of substrates. Acrylamide is an example of a crosslinker which may be used in this manner as it requires an activator as formaldehyde for its crosslinking action.

The amount of hardener which may be used in preparing the backbone copolymer will vary with the nature of the hardener or hardeners, the rubbery monomer or monomers, and on the properties desired in the product. In general, the hardener should not constitute over about 20 percent by weight of the backbone copolymer, and preferably not over about 15 percent. In the case of acrylonitrile it is generally not desirable to use over 15 percent and preferably from 1–10 percent is used. In the case of the acid hardeners, no more than 5 percent of the acid should be used. When the rubbery monomer itself produces a backbone copolymer having a sufficiently high glass transition temperature, no hardener need be used. Thus, when ethyl acrylate is used for the rubbery monomer, no hardener is generally needed. A mixture of hardeners may be used. Thus, non-acidic hardeners as acrylonitrile, vinylidene chloride or methyl methacrylate may be used with one or more acidic hardeners to give the desired total hardener content.

CROSSLINKER

The monomers used to crosslink the backbone copolymers comprise from about 0.1 to 5 percent of the copolymer although only part may be used in the crosslinking reaction. The use of excess amounts of the crosslinking monomer (i.e. greater than about 5 percent) in preparing the backbone copolymer is advantageous, however, in making possible more rapid curing, in providing reactive groups in the resulting product which improve the dye receptivity and other properties of the polymer, and to act as hardeners as described above. When the crosslinker constitutes more than about 5 percent by weight of the backbone, the crosslinker must be so selected as to control the amount of crosslinking in order to prevent excessive crosslinking which would be detrimental to the elasticity of the copolymers. This control is exercised by using as a crosslinker a monomer or monomers which require an activator. The monomers effective as crosslinkers are unsaturated monomers copolymerizable with the alkyl acrylates and containing one or more reactive groups whose reactivity is triggered separately from the polymerization reaction. A preferred class of such reactive groups are those which are capable of undergoing a condensation reaction such as amide, alcoholic hydroxyl, carboxylic acid, ureido, epoxy, etc.

Another type of monomer that may be used as a crosslinker in the backbone is one that contains one (and only one) unsaturated carbon-to-carbon linkage of sufficient reactivity to allow copolymerization with the other monomer(s) in the backbone and one or more additional unsaturated carbon-to-carbon linkages which are of too low a reactivity to undergo such copolymerization. When a copolymer is formed using such a monomer, the unsaturated linkages of low reactivity will be attached to the polymer chain as pendant groups, i.e. they will not be part of the polymer chain itself. Such pendant unsaturated linkages of low reactivity may be used to crosslink the polymer chains as by a vulcanizing process using sulfur, dicumyl peroxide or resin cures. Such processes are particularly applicable to sheet stock and to molding compositions. Examples of such crosslinkers are vinyl crotonate and 2-butenyl methacrylate. With the exception of this type of crosslinker (i.e. one giving only pendant unsaturated linkages in the copolymer), all other monomers used as crosslinkers are monoethylenically unsaturated.

Examples of monomers that may be used to provide reactive groups that can undergo a condensation reaction include the following:

For alcoholic hydroxyl:

Hydroxyalkyl vinyl ethers or sulfides in which the hydroxyalkyl group contains 1 to 3 hydroxyl groups and two to 18 carbon atoms, such as β-hydroxyethyl vinyl ether, β-hydroxyethyl vinyl sulfide, 5-hydroxypentyl vinyl sulfide, and 18-hydroxyoctadecyl vinyl sulfide.

A hydroxyl-containing ester of an α,β-monoethylenically unsaturated acid in which the hydroxy group may be in the acid or the alcoholic moiety of the ester or both such moieties may contain hydroxyl. The unsaturated acid from which the ester is derived may be monocarboxylic or polycarboxylic. Examples include acrylic, methacrylic, itaconic, maleic, fumaric, crotonic, α-hydroxyalkyl-acrylic, aconitic, citraconic, α-acryloxyacetic, and α-methacryloxpropionic. Representative esters are 2-hydroxyethyl acrylate or methacrylate, methyl α-(hydroxymethyl)-acrylate, ethyl α-(hydroxymethyl)-acrylate, butyl α-(2-hydroxyethyl)-acrylate, 2-hydroxypropyl acrylate or methacrylate, 3-hydroxypropyl acrylate or methacrylate, methyl α-(2-hydroxypropyl)-acrylate, ethyl α-(3-hydroxypropyl)-acrylate, 4-hydroxybutyl acrylate or methacrylate, 10-hydroxydecyl acrylate or methacrylate, the corresponding hydroxyalkyl crotonates, di(2-hydroxyethyl)maleate or fumarate, di(10-hydroxydecyl) maleate or fumarate, the corresponding itaconates, mixed esters of dibasic acids containing a single hydroxy group as monohydroxyethyl-monomethyl maleate, and the like. Additionally, other substituents may be incorporated into the alkyl chain, including secondary hydroxy groups, halide radicals, nitrile radicals, and the like, such as 2,3-dihydroxypropyl acrylate, 3,5-dihydroxyamyl crotonate, 6,10dihydroxydecyl methacrylate, di-2,6-dihydroxyhexyl maleate, and di-2-chloro-7-hydroxyheptyl fumarate. In all cases, the hydroxyl of each hydroxyalkyl group is at least two carbon atoms removed from the carbon atom of the adjacent —COO— radical in the ester.

For amides:
Compounds of the formula:

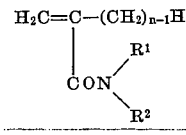

wherein $n$ is an integer having a value of 1 to 4, $R^1$ and $R^2$ are H, phenyl, methylbenzyl, benzyl, cyclohexyl, alkyl having one to six carbon atoms, hydroxyalkyl having one to six carbon atoms, N-alkoxyalkyl having two to six carbon atoms, and N-acyloxyalkyl having two to six carbon atoms, except that at least one of $R^1$ and $R^2$ must be H, hydroxyalkyl N-alkoxyalkyl or N-acyloxyalkyl as above defined.

Also compounds of the formula:

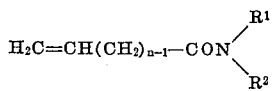

wherein $n$, $R^1$ and $R^2$ are as above defined.

Examples of suitable amides include acrylamide, methacrylamide, N-methylol-acrylamide, N-methoxymethyl-methacrylamide, N-butoxymethylacrylamide, N-β-hydroxyethylacrylamide, N-methylacrylamide, 4-pentenamide, N-methylol-4-pentenamide, N-acetoxymethyl acrylamide, and N-benzylacrylamide. Amides and imides of dibasic unsaturated acids may also be used.

For ureido:
Compounds of the formula:
$$H_2C = C(R)ZA^1N(R^3)CXNR^1R^2$$
wherein $R^3$ is selected from the group consisting of H, alkyl groups having one to four carbon atoms, hydroxyalkyl groups having one to four carbon atoms, and alkoxymethyl groups having two to five carbon atoms,
$A^1$ is an alkylene group having two to eight carbon atoms,
Z is O, S,

R is H or methyl,
$R^1$ and $R^2$ are as defined hereinbefore, and
X is selected from the group consisting of oxygen and sulfur.

Examples of these compounds include β-ureidoethyl vinyl ether, β-ureidoethyl vinyl sulfide, β-thioureidoethyl vinyl ether, β-thioureidoethyl vinyl sulfide, β-ureidoethyl acrylate, β-thioureidoethyl methacrylate, N-(β-ureidoethyl) acrylamide, N-(β-ureidoethyl)methacrylamide, N-methyl-N'-β-methacryloxyethylurea, N-methylol-N'-methylol-N'-β-acryloxyethyl-urea.

Among the ureido-containing monomers, those containing a cyclic ureido group of the following formula are also quite useful:

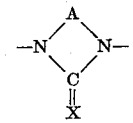

wherein X is as defined above and A is an alkylene group having two to three carbon atoms. One of the nitrogen atoms is connected to a polymerizable monoethylenically unsaturated radical and the substituent on the other nitrogen may simply be hydrogen, or it may be methylol, alkoxymethyl having two to five carbon atoms, hydroxyalkyl having two to four carbon atoms or an aminoalkyl group having two to eight carbon atoms.

The preferred cyclic ureido compounds are those which contain the group:

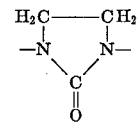

which may be termed the cyclic N,N'-ethyleneureido group.

Many monoethylenically unsaturated monomers contain cyclic ureido groups and are useful as crosslinkers for carrying out the invention. Compounds of the following formulas wherein Y represents the group of the formula above and $R^4$ is H, methylol or methoxymethyl, but is preferably H, are typical:

$$H_2C = CHYR^4$$
$$H_2C = CHXAYR^4$$
wherein X and A are as defined hereinabove;

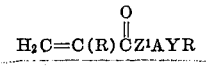

where $Z^1$ is selected from the group consisting of —O— and $NR^5$, $R^5$ being selected from the group consisting of H, cyclohexyl, benzyl, and an alkyl group having one to six carbon atoms, and A and R are as defined hereinabove;

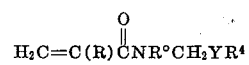

wherein $R°$ is H or alkyl of one to 12 carbon atoms, and R, Y and $R^4$ are as defined hereinabove;

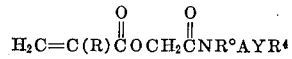

wherein R, $R°$, $R^4$, Y and A are as defined hereinabove. Also included are acids in which the nitrogen atoms of maleamic acid, chloromaleamic acid, fumaramic acid, itaconamic acid, or citraconamic acid is substituted by, and directly connected to a group of the formula:

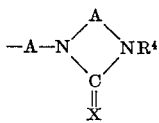

wherein A, X and R⁴ are as defined hereinabove. The N-substituted amic acid and esters derived from maleamic acid are typical and have the following generic formula:

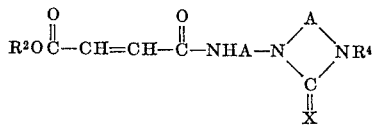

wherein A, X, R² and R⁴ are as defined hereinabove. The internal cyclic imides derived from maleamic acid have the formula:

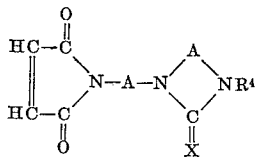

Other such monomers have the following formula:

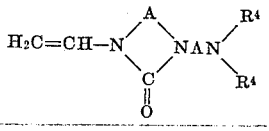

wherein A and R⁴ are as defined hereinbefore and one R⁴ may be the same or different than the other;

The unsaturated dicarboxylic acid monoesters of a compound of the formula:

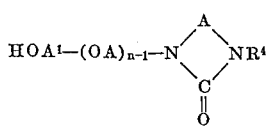

wherein A¹, n, A and R⁴ are as defined hereinbefore, derived from maleic, fumaric, chloromaleic, itaconic, or citraconic acid.

For epoxy:

Any monoethylenically unsaturated monomer containing a glycidyl radical may be used. Preferred monomers are glycidyl acrylate, glycidyl methacrylate, and the vinyl ethers and sulfides containing a glycidyl radical described by Murdock and Schneider in U.S. Pat. No. 2,949,474.

For carboxylic acid:

Any α,β-monoethylenically unsaturated monocarboxylic or dicarboxylic acid may be used. Examples are acrylic acid, methacrylic acid, maleic acid, fumaric acid, itaconic acid, citraconic acid, mesaconic acid, etc. Monoesters of the dibasic acids may also be used, as monomethyl maleate, monobutyl itaconate, etc. The anhydrides, as maleic anhydride, may be used, though generally hydrolysis occurs in the emulsion leading to formation of the free acid.

Other condensation-type crosslinking systems may be used such as methoxymethyl vinyl sulfide, 2-aminoethyl methacrylate, blocked isocyanatoethyl methacrylate, 2-(ω-alkenyl)-guanamines as disclosed in U.S. Pat. No. 3,446,777 etc.

These monomers may be used alone or in combination. Suitable combinations of reactive crosslinking monomers result in a copolymer which is self-curing; that is, the two types of reactive groups present in the copolymer react with each other to cure the copolymer. Thus, methacrylamide, acrylamide, and/or 4-pentenamide with one or more of the corresponding N-methylol derivatives, hydroxyethyl acrylate with itaconic acid, glycidyl methacrylate with methacrylic acid and/or hydroxypropyl methacrylate, etc., are examples of such combinations of crosslinking monomers. If desired, a single crosslinking monomer may be used which requires that the copolymer be treated with an additional chemical reagent to effect cure. In this event the additional chemical reagent should be miscible with the emulsion. Thus, when an amide, as acrylamide, and/or methacrylamide is used as the sole crosslinking agent, the polymer must be treated with a chemical such as glyoxal, α-hydroxyadipaldehyde, other dialdehydes, formaldehyde or a formaldehyde-yielding material. Formaldehyde-containing polymer forming materials miscible with the emulsion such as low molecular weight methylolated urea-formaldehyde, melamine-formaldehyde or phenol-formaldehyde condensates may be used. A single monomer which is self-condensing may also be used, such as the N-methylol derivatives of acrylamide, methacrylamide, 4-pentenamide, etc. Combinations of the same type of reactive monomer may also be used. Thus, N-methylol methacrylamide and N-methylol-4-pentanamide may be used, or glycidyl methacrylate with hydroxypropyl methacrylate and methacrylic acid, or N-methylolacrylamide with N-acetoxyacrylamide, or hydroxyethyl methacrylate with methacrylic acid and itaconic acid, etc. Mixed crosslinking systems may also be used with a mechanical mixture of latexes for the backbone. Thus, one latex of butyl acrylate-glycidyl methacrylate may be mixed with a latex of butyl acrylate-methacrylic acid and then the unsaturated halide-modifier mixture polymerized on the mixed latex or a latex thereof added to the mixed-backbone latex. Such a system simplifies the handling of the more reactive crosslinking combinations. The use of monoethylenically unsaturated compounds containing reactive groups to effect crosslinking makes possible adequate crosslinking without the introduction of unsaturated carbon-to-carbon bonds into the copolymer chain.

REINFORCING MATERIAL

The reinforcing material contains at least one α,β-monoethylenically unsaturated halide selected from the group consisting of vinylidene chloride, vinylidene fluoride, vinylidene fluorochloride, vinyl chloride and vinyl fluoride (hereinafter referred to as the "unsaturated halide"), and, optionally, any copolymerizable α,β-monoethylenically unsaturated monomer (hereinafter termed the "modifier"). Although the nature of the modifier is not critical, the concentration of the modifier is highly important. The desirable range of concentration varies with the nature of the modifier monomer. In general, the modifier constitutes about 0 to 6 percent of the combined unsaturated halide-modifier mixture and preferably from about 0 to 3 percent. Where an acidic monomer (e.g., acrylic or methacrylic acid) is used as the sole modifier, it is preferred to use from about 0.5 to about 1 percent modifier by weight. The principal function of the modifier is believed to be to modify without eliminating the crystallinity of polyvinylidene chloride. The use of a modifier is less significant for the other unsaturated halides.

The polymer of the unsaturated halide-modifier mixture serves as a reinforcing filler to improve the properties of the acrylate elastomer, although the precise mechanism whereby it does this is not known. X-ray studies of fibers prepared from the products of the invention indicate that, in the case of vinylidene chloride as the unsaturated halide, there are present particles (presumed to be a polymer or copolymer of vinylidene chloride polymerized on the backbone) which are crystalline, though they are so tiny as to be seen only under an electron microscope. Increasing the amount of modifier correspondingly decreases both the degree of crystallinity and the melting point of the particles. After stretch-curing, the vinylidene chloride particles shown by X-ray are both crystalline and oriented. On immersing a stretch-cured fiber in a swelling solvent, the swelling is approximately anisotropic, whereas the same fiber without stretch-curing shows isotropic swelling. Thus, stretch-cured shaped products produced according to the invention are believed to have an oriented backbone reinforced with microcrystalline particles of a reinforcing filler, which particles are both crystalline and oriented.

The significance of orientation in the crystallites is not known, though it is believed that orientation is not necessary for the effective reinforcing action of the filler, since reinforcing is observed on materials which are not stretch-cured while orientation is observed only after stretch-curing. Too high a modifier content will result in an undesirable product. Thus, as the amount of modifier is increased above the range given, the physical properties (particularly the tensile strength) of the resulting sequential copolymer are degraded. At lower modifier levels, the polymers have improved heat-setting properties. Either one or a mixture of monomers may be used for the modifier.

Suitable monomers which serve as modifiers of vinylidene chloride are, for example, vinyl chloride, acrylonitrile, acrylic acid esters, methacrylic acid esters, maleic acid esters, vinyl acetate and other vinyl esters, styrene, etc. A more complete list of monomers copolymerizable with vinylidene chloride is given in Krczil, "Kurzes Handbuch der Polymerisationstechnik", Vol. II, "Mehrstoffpolymerisation", Edwards Bros., Inc. p. 739, the items indented under "vinylidene chloride". A similar list of monomers copolymerizable with vinyl chloride is given by Krczil, op. cit., at pages 735 to 737. Vinyl fluoride and vinylidene fluoride are more difficult to polymerize. In general, more highly polar modifiers such as acrylonitrile are preferred for use with the fluoride monomers. For the chloride monomers, it is preferred to use the residual monomer(s) from the backbone as the modifier.

POLYMERIZATION CONDITIONS

Textile constructions require premium properties from fibers. When the elastomeric materials of the invention are to be spun into fibers, it is preferred to prepare them by sequential polymerization. In this case, the order of polymerization is critical in developing compositions having the desired properties. In preparing the elastomeric sequential copolymer, the monomers for the backbone copolymer are first emulsion copolymerized using a free radical catalyst. The art of emulsion polymerization is well-known and the conditions of polymerization used herein are not critical. These aqueous dispersions may be made using one or more emulsifiers of anionic, cationic or nonionic type. Mixtures of two or more emulsifiers, regardless of type, may be used excepting that it is generally undesirable to mix a cationic with an anionic type in any appreciable amounts since they tend to neutralize each other. The amount of emulsifier may range from about 0.1 to 6 percent by weight or sometimes even more, based on the weight of the total monomer charge. When using a persulfate type of initiator, the use of emulsifier is often unnecessary and this, or the use of only a small amount, e.g., less than about 0.5 percent of emulsifier, may sometimes be desirable from the cost standpoint.

The free radical catalyst may be either water-soluble or oil-soluble. The invention contemplates the use of any of the free radical catalysts known to the art as effective to catalyze the polymerization of the monomers used herein. Particularly preferred are the peroxy catalysts and the azo-type catalysts. Typical catalysts which may be used are peroxides, such as hydrogen peroxide, dibutyl peroxide, acetyl peroxide, benzoyl peroxide; alkyl percarbonates; hydroperoxides, such as t-butylhydroperoxide, cumene hydroperoxide, p-menthane hydroperoxide, etc.; perborates as the alkali metal and ammonium perborates; persulfates as the alkali metal and ammonium persulfates; etc. Other catalysts such as $\alpha,\alpha'$-azodiisobutyronitrile, diazoaminobenzene, etc. can be used. The quantity of catalyst used can be varied depending on the monomer, the temperatures and the method of addition. Generally from about 0.001 to 5 percent by weight, based on the weight of the monomers, is used. If desired, catalyst may be omitted and ultraviolet radiation used for the polymerization. The catalyst may be used with a redox system. A buffer may be used for either or both stages of the polymerization.

The catalyst, emulsifier and monomer charge may all be added initially or one or more may be added incrementally as polymerization proceeds. Generally the monomers used in the particular phase (i.e., the backbone or the reinforcer) are mixed (except, of course, where one is gaseous and the other is liquid) and the mixture used as the monomer charge. If desired, however, the monomers may be added separately and at a differential rate, e.g., in the case of the backbone part of the crosslinker may be dissolved in the rubbery monomer and the entire mixture charged to the reactor with the remaining part of the crosslinker being added incrementally as polymerization proceeds or all the crosslinker may be charged initially with part of the rubbery monomer while the remaining rubbery monomer is added incrementally or the hardener may be added incrementally, etc. One type of catalyst and/or emulsifier may be used in the polymerization of the backbone copolymer and a different catalyst and/or emulsifier used for the subsequent polymerization thereon of the unsaturated halide-modifier mixture, or the same catalyst and/or emulsifier may be used for both polymerizations as desired.

The temperature of polymerization is not critical and may be varied at the choice of the operator. Where a temperature below 0° C. is used, a freezing point depressant, as ethylene glycol, should be added to the water. The polymerization may be conducted at atmospheric pressure or with the application of high pressures. The choice of the monomers, particularly for the second stage of the polymerization will influence the choice of the pressure to be used. Optimum polymerization times will vary inter alia with the nature of the catalyst and the monomers, with the temperature and pressure and with the degree of completeness to which it is desired to carry the polymerization.

It is preferred that any residual monomer remaining after the first polymerization be at a minimum. This may be done, for example, by purging the reaction mixture after completion of the polymerization of the backbone to remove any residual monomer, by carrying the initial polymerization through to an extremely high degree of completion, by sorbing the monomer out, by distilling it out, or by a combination of two or more of these procedures. After completion of the polymerization of the backbone copolymer, the components of the unsaturated halide-modifier mixture, optionally together with additional catalyst and/or emulsifier, are charged to the latex formed by the backbone copolymer either in one batch, in two or more stages or incrementally as polymerization proceeds and the polymerization completed. The molecular weight of the backbone (before crosslinking) is from about 100,000 to 10,000,000 or higher while reinforcer is generally from about 20,000 to 1 million or higher.

Where the residual monomer content is accurately known, it may comprise all or part of the modifier content for the unsaturated halide. In this case, residual monomer would not be removed upon completion of polymerization of the backbone copolymer.

Reversing the sequence of polymerization, i.e., using the unsaturated halide as the backbone, results in decreased dynamic properties. Accordingly, as stated above in describing this embodiment, to achieve optimum properties it is important in preparing the shaped copolymers of the instant invention to first prepare the rubbery backbone copolymer and then subsequently polymerize the unsaturated halide-modifier mixture on this rubbery backbone.

With the exception of the role of residual monomer, the same general considerations and conditions are applicable to the preparation of separate latexes of the base composition and of the reinforcing material which are then mechanically mixed as described.

The backbone copolymer makes up from about 50 to 90 percent of the total polymeric composition. As the amount of backbone copolymer decreases, the composition becomes stiffer and less resilient. Conversely, as the amount of the backbone copolymer increases, the composition becomes softer and has lower tensile strength and modulus. It is preferred that the backbone copolymer make up from about 60 to 80 percent of the elastomeric material. The preferred rubbery monomer for the backbone is butyl acrylate, and the preferred unsaturated halide is vinylidene chloride. To prevent any unwanted dehalogenation of the halide polymer, the pH of the second stage during the polymerization should not be greater than about 6.5, while to obtain proper spinning with the anionic emulsifiers customarily used, the pH of the spinning latex should not be lower than about 2.

USES

The novel polymers of the invention have a variety of useful applications. Thus, they may be used as protective coatings for wood, metal, etc.; coatings for paper, leather, textiles, etc.; gaskets; mechanical goods; binders for non-woven textiles; and other applications where rubber latexes have been found useful. They are highly useful in the preparation of elastomeric foams. The excellent tensile strength and elasticity of the products of the invention coupled with their superior resistance to solvents, chlorine and peroxide bleaches, ultraviolet, etc. characterize these products as superior materials for such uses.

SPINNING

The latexes prepared as described are particularly suitable for the preparation of shaped structures. By the term "shaped structure" is meant structures having at least one very small dimension so that the term is limited to fibers and films. In describing the processes used to prepare shaped structures, only fibers will be discussed, but it is to be understood that the same general techniques may be used to produce films.

After preparation of the latex, the resulting emulsion is then spun, coagulated and cured. Before spinning the latex may be modified as by adjusting the pH; deionizing or dialyzing the latex; adding soaps to improve spinnability; adding dispersing agents, opacifiers, dyes, pigments, etc.; adding crosslinkers or activators for crosslinkers such as formaldehyde; creaming the latex using high molecular weight thickeners; etc. Small amounts of polymers may be added as solutions or latexes to improve viscosity, dyeability, etc.

Spinning and coagulation are carried out in a single step. The process of emulsion spinning is described in U.S. Pat. Nos. 2,869,977; 2,914,376; and 2,972,511 and the disclosures of these patents are incorporated herein. While the selection of a specific spinning process will depend upon the nature of the emulsion, by reason of its rapid penetration and volatility thereby eliminating any problem from undesirable residues, it is preferred to use hydrochloric acid for the coagulating bath. For this acid, the coagulating bath should contain from about 9 to 37 percent hydrochloric acid by weight. If desired, a salt as sodium or calcium chloride can be added to the acidic bath to assist the coagulating action. Although the invention will be described in terms of an acidic coagulating bath, it is understood that the process is not limited thereto and either alkaline or all salt systems may be used as disclosed in the above-cited patents although due care must be observed with alkaline systems (i.e., in terms of temperature and concentration) to prevent dehalogenation of the halide polymer.

While it is preferred to spin the emulsions into a coagulating bath as described, the emulsions may also be dry spun as described in British Pat. No. 853,483. To prevent thermal degradation, it is preferred to use lower temperatures than normal for dry spinning and to extrude the fibers onto a heated abhesive support as a steel belt coated with poly(tetrafluoroethylene) or onto a heated liquid surface or interface or within a heated liquid.

The elastomeric materials of the invention need no fusion aid, nor plasticizer, nor heating step to promote fusion of the particles in a separate fusion step as is conventional in spinning latexes of synthetic polymeric materials. Coalescence or fusion proceeds as the latex dries. Thus, a latex of the elastomeric materials of the invention is similar to natural rubber latex in this regard. The spinning and coagulating bath is maintained at a temperature between about 0° and 100° C. and preferably between about 25° and 70° C. For very short yarn travel paths, even higher temperatures may be used.

POST-SPINNING PROCESSING

On leaving the spinning and coagulating bath, the fiber is washed. Where the coagulant is a volatile acid as HCl washing may be omitted. The washing need not be carried out to remove all traces of acid remaining, as such traces serve to catalyze many of the condensation reactions used in crosslinking the polymer chains. Where the polymer contains free carboxylic acid units in the polymer chain (as by inclusion in the hardener or crosslinker of the rubbery backbone and/or in the modifier for the unsaturated halide), such acidic units occurring in the polymer chain serve as a built-in catalyst to promote the condensation step. Thus, it is not essential in the instant invention to retain a trace amount of the acid from the coagulating bath.

Curing ("curing" as used herein is synonymous with crosslinking) is accomplished by heating the fiber or film generally in the presence of a catalyst (the nature of the catalyst being determined by the crosslinking reaction, though generally acid catalysts are used), at a temperature of from about 75° to 220° C. for from about 3 hours to a few seconds, the longer time corresponding to the lower temperature and the shorter time of cure corresponding to the upper temperature. The precise time and temperature will depend on the properties desired in the final product, the nature of the monomers used in preparing the elastomeric material, the necessity of avoiding the evolution of steam at a rate which would create bubbles in the fiber, on the number and type of crosslinking monomer units in the backbone, and on the concentration and nature of the catalysts provided for the curing step.

According to one embodiment optimum fiber properties are obtained by carrying out the cure in two steps: the fiber is partially cured, then stretched and the cure completed while the fiber is held in the stretched condition. In the preferred embodiment the cure is completed, then the fiber is stretched from 0 to 300 percent and heated to a temperature sufficient to melt the reinforcing material (the sequence of melting and stretching is not critical, i.e., the fiber may be heated and then stretched, or stretched and then heated or heated and stretched simultaneously or stretching may be omitted entirely), and finally the reinforcing material resolidifies. The fiber becomes somewhat tacky during the melting step, so care must be taken in handling the fiber at least until resolidification has progressed sufficiently to reduce the tack. Generally a higher level of crosslinker is used when it is intended to use the two-step curing process than would be the case in the single-step cure. It is also advantageous to have a melt and recrystallize step in the two-step cure process. Generally this is done by carrying out the second cure at a high enough temperature to melt the reinforcing material.

Where the unsaturated halide is vinylidene chloride and the elastomeric material is prepared by mechanically blending latexes of the base composition and of the reinforcing material, the fiber must be heated to temperatures above about 160° C. in order to develop the desired properties. This may be a separate melting step or the melting may occur by carrying out the final cure at this temperature as previously described. The highly crystalline nature of the polymer produced from vinylidene chloride appears to be a significant factor in this phenomenon as the minimum temperature needed to develop the desired properties appears to vary (within limits) inversely with the amount of modifier in the vinylidene chloride polymer. It is believed that at these temperatures the polyvinylidene chloride melts and, upon cooling, recrystallizes. While this melting step appears critical for blends used as fibers, it is desirable to do the same in the case of the sequential polymers in order to develop optimum properties. The use of unsaturated halides giving less crystalline products, such as vinyl chloride, in mechanical blends does not show this property (i.e., optimum properties only after a melting step), nor do sequential copolymers even when the unsaturated halide is vinylidene chloride.

As disclosed, the curing may be carried out in steps. Thus, the fiber or film may be partially cured to increase the strength of the fiber or film to permit handling of the material during the stretching and final cure operations. The partial curing appears important to obtain the optimum results from a final stretch-cure though this need not be carried out as a separate step, but may be the initial part of a continuous cure process. Stretch-curing achieves a certain minimum stabilization of orientation in the backbone copolymer chains which assists the action of the unsaturated halide-modifier copolymer in improving tensile strength and modulus. As the conditions of curing tend to cause disorientation, it is evident that the best properties for a particular use from a given system require careful control of the precure, stretching and final cure. Adequate partial curing to accomplish this may be achieved in from 30 minutes to 0.1 minute or less, at a temperature of from about 75° C. to about 150° C. Again, the longer time is used for the lower temperature while a shorter time is used for the higher temperature limit. At the upper temperature range, care must be taken that the temperature and duration of the heating step are not such as to cause discoloration. Air-drying of the fiber at room temperature achieves adequate partial curing, though longer times are necessary. Preferably, the partial curing is accomplished in a few seconds to five minutes at a temperature of about 75° to 150° C. The fiber or film is then stretched about 50 to 300 percent or higher and, while held in the stretched condition, the cure is completed. Jet stretching, i.e., stretching by pulling the fiber away from the spinning jet, appears to change only denier and may be used to obtain the desired denier. Again, the final cure may be carried out in about 3 hours to seconds at 75 to 220° C. (All temperatures specified in this discussion of curing refer to the temperature of the medium surrounding the fibers, which temperature is not necessarily the temperature of the fibers). The final stretch-curing operation may be carried out by winding the fiber on a bobbin under a sufficient tension to impart the desired degree of stretch and the curing carried out on the bobbin.

As will be obvious to those skilled in the art, a great variety of stretching operations may be used. The fibers may be stretched while passing from the godet at the exit from the coagulating bath onto the drying rolls. It is generally preferred to stretch from 50–250 percent at this point. Curing may take place on the drying rolls or while being drawn through a steam chamber or other heating device. In the case of the two-step cure, stretch-curing significantly increases the tensile strength of the resulting products.

In the preferred embodiment, the melting step is generally carried out by contacting the fiber with a roll having a surface temperature of 180°–240° C. for from 1 minute to 0.1 minute. Lower temperatures may be used with longer contact times and/or with higher modifier contents in the reinforcing material. Although these temperatures are above the melting point of polyvinylidene chloride, it is believed that not all of the material is melted in the contact times given. Nevertheless, the conditions specified are adequate to obtain products having improved properties. The recrystallization may be done on the bobbin, on a heated roll or oven or other temperature controlling device. For optimum crystallite formation, it is preferred to hold the fiber at 60°–140° C. rather than cooling to room temperature or below immediately after melting. The optimum temperature for recrystallization is believed to be midway between the glass temperature and the melting point of the reinforcing material. After recrystallization, a relaxing step may be used. In the relaxing step the fiber is heated to 100° – ⅛° C. for 60 – 1 minute while held at zero or almost zero tension. Although carrying out the melting and recrystallization while the fiber is stretched gives optimum tensile strength, tensile properties are improved merely by curing, melting and recrystallizing without any stretching. The steps of melting and recrystallization preferably under stretch are highly important when the reinforcing material is either vinylidene chloride or vinylidene fluoride. They do not appear significant for reinforcing materials of the other unsaturated halides.

The latexes produced by the invention may be spun through a single filament jet to produce a monofil. Monofils of large diameter may be produced by spinning about 10 to 100 or more separate filaments in a multifilament jet and coalescing the separate filaments to form a single large denier filament. Thus, filaments of from about 10 to 3,000 denier may be produced as desired. The latex may also be spun through a multifilament jet to produce a multifilament tow. The fiber may be chopped up into staple in which form it may be blended with non-elastic staple fibers (both natural and synthetic) and spun.

The elastomeric fibers produced according to the invention have physical properties far superior to those heretofore obtainable with acrylic rubbers and equaling or surpassing natural rubber and spandex fibers in many properties. At the same time, while possessing such vastly improved physical properties, the acrylic elastomeric fibers of the invention retain the premium properties of stability, color, etc. associated with the acrylic elastomers. As a result of their excellent physical properties, fibers of the acrylic elastomers of the invention may be used in any of the applications heretofore associated with natural rubber or spandex fibers. Thus, the fibers of the invention are useful in weaving and knitting generally; in producing tricot knits and leno weaves; and in producing covered fibers as those described in U.S. Pat. No. 3,038,295 or 3,011,302. The fibers may also be used in producing a plied fiber as described in U.S. Pat. No. 3,234,724 by M. Storti, and in U.S. Pat. No. 3,234,725 by M. Storti.

Crimped elastomeric fibers may be produced by drying and curing the fiber after spinning, then melting the polyvinylidene chloride by passing it around a roll maintained just at or near the melting point of the polyvinylidene chloride, then stretching to the bobbin, cooling on the bobbin, removing the fiber from the bobbin and relaxing it. Fiber so crimped may be chopped into staple and blended with non-elastomeric fibers or may be used as continuous multifilament.

The sequential copolymers wherein vinylidene chloride is the unsaturated halide component in the reinforcing material are particularly preferred. These copolymers are transparent with good clarity and they offer premium physical properties. While the compositions of the invention generally offer ultraviolet stability, resistance to bleaches, dry-cleanability, fire-retardation properties, etc., combined with the modulus, elongation and tensile strength useful in elastic fibers, the preferred sequential copolymers are particularly outstanding in that the optimum copolymers possess an exceptional combination of modulus, elongation and tensile strength without sacrifice of the other desirable properties.

In the examples:

Tensile strengths of all fiber samples are determined on an Instron Tester and are measured in pounds per square inch.

Elongation means elongation at the break. It is measured by placing bench marks two centimeters apart on a uniformly cut sample and stretching it until it breaks. The percent elongation is then the distance between the marks at failure minus 2, divided by 2 and times 100.

Set is the unrecovered stretch after an elastomer is stretched and allowed to relax freely. It is determined by placing bench marks on the sample two centimeters apart and stretching it 300 percent and holding for ten minutes. Where the sample is stretched more or less than 300 percent, the amount of stretch is specifically indicated. The sample is released and measured after 10 minutes. Set is recorded as the length of the sample at the 10-minute measurement, minus 2, divided by 2 and times 100.

Return modulus is the stress on the return cycle after a strain larger than that at the measured point has been imposed. In determining return modulus, the sample is placed in the Instron Tester, elongated to a point below the breaking elongation, the crosshead returned to the rest position and cycled in this manner for six cycles. On the sixth cycle, the return modulus is recorded in pounds per square inch unless otherwise specified.

The term "stretch-cure" as used herein denotes the process wherein the fiber is either first partially cured and then held in a stretched condition during completion of the cure or is first cured and then stretched while the polyvinylidene chloride is melted and recrystallized. In the examples, the "Stretch-Cure" is the amount of stretch (as a percent of the length of the relaxed fiber) maintained during either completion of the cure or recrystallization.

Tenacity is the ultimate tensile strength of the fiber in grams per denier.

To assist those skilled in the art to practice the present invention, the following modes of operation are suggested by way of illustration:

EXAMPLE 1

A solution is prepared of 8 parts of the sodium salt of an alkyl aryl polyether sulfonate (NaAAPS) (27 percent solids) and 0.01 part of ferrous sulphate in 120 parts of deionized water. A mixture of 58.8 parts of ethyl acrylate (EA), 0.4 part of acrylamide (AAm) and 0.8 part of N-methylolacrylamide (N-MlAm) is added with stirring to the solution which is maintained under a nitrogen atmosphere. The resulting mixture is cooled to 20° C. and maintained at this temperature by a cooling bath. A catalyst charge consisting of 0.3 part of ammonium persulfate (APS), 0.3 part of sodium metabisulfite and 0.15 part of t-butyl hydroperoxide (t-BHP) is then added. In a short time, the temperature of the mixture rises to 52°–56° C. It is allowed to fall to 25° C. under the influence of the 20° C. bath. At this point, 80 parts of water, 39 parts of vinylidene chloride (VCL$_2$) and 1 part of methyl methacrylate (MMA) are added and the mixture is stirred for 15 minutes and a catalyst charge consisting of 0.3 part of APS, 0.3 part of sodium metabisulfite and 0.15 part of t-BHP is added. In a short time, the temperature rises to 42°–43° C. and then subsides. Overall yield is 98–99 percent of theory.

A suitable apparatus for spinning the emulsion is shown semi-diagrammatically in the drawing. The emulsion from a suitable supply 1 is spun through a 12 mil I.D. glass capillary 2 immersed in a bath 3 of 35 percent HCl and the fiber 12 is carried out of the bath over a constant speed roll 4. The fiber is washed by passing under a set of godets 5—5 immersed in a fresh water bath 6 and is then passed onto a belt 7 in a heated zone 8 held at 120° C. The godets and belt are operated on the same linear rate as is the roll. The total time on the belt is 1.5 minutes. The fiber is taken from the belt, passed around a godet 9 and wound on a bobbin 10 by a collector (not shown). Three samples are collected on different bobbins with the collector being run at different linear speeds relative to the belt for each one. The difference in speed stretches the fiber commensurately. When the desired amount has been collected, the bobbin is removed from the collector, the fiber end is taped to the bobbin and the bobbin is placed in a forced draft oven held at 100° C. for 1 hour to complete the cure. In another embodiment, the thread is passed around heated thread advancing rolls 11 and cured thereon prior to collection on the bobbin. The amount of stretch applied to each fiber during curing and the properties of the fibers produced are shown in Table I:

TABLE I

| Stretch cure | Tenacity | Elongation | Return modulus 100/200 | Running set (from 200%) |
|---|---|---|---|---|
| 123 | .28 | 245 | 70 | 60 |
| 137 | .41 | 210 | 85 | 55 |
| 150 | .30 | 212 | 85 | 55 |

EXAMPLE 2

A solution is prepared of 2.8 parts of sodium lauryl sulfate (SLS) and 140 parts of deionized water. A mixture of 59.5 parts of butyl acrylate (BA), 9.1 parts of acrylonitrile (AN), 0.56 part of methacrylamide (MAM) and 0.84 part of N-methylolmethacrylamide (MlMAN) is added with stirring. The mixture is stirred for 30 minutes while being purged with nitrogen and cooled to 20° C. A solution of 0.1 part of APS in 2 parts of water is then added followed by the addition of 0.04 part of sodium formaldehyde sulfoxylate (SFS) in 2 parts of water. Stirring is continued throughout the reaction. In a short time, the temperature climbs to 52° C. where it is maintained by a 20° C. cooling bath. When the temperature has fallen to 40° C., a solution of 0.05 part of APS in 1 part of water is added followed by the addition of 0.02 part of t-BHP. After 4 hours, a mixture of 29.4 parts of VCl$_2$, 0.6 part of ethyl acrylate (EA) and 60 parts of water is added. After 15 minutes, 0.1 part of APS in 2 parts of water, 0.06 part of SFS in 3 parts of water and 0.02 part of t-BHP are added. The temperature quickly rises to 35°–37° C. and after one hour the reaction is complete. The total yield is 98°–100 percent.

The emulsion is spun as in Example 1, except that the coagulating bath contains 30 percent HCl. The pre-curing time, i.e. the preliminary cure on the belt, is varied as well as the amount of stretch applied during the curing, as shown in Table II:

TABLE II

| Precure time at 100° C. (min.) | Stretch cure | Tenacity | Elongation |
|---|---|---|---|
| 1.5 | 0 | 0.20 | 500 |
| 1.5 | 100 | 0.35 | 315 |
| 1.5 | 200 | 0.43 | 280 |
| 1.5 | 300 | 0.57 | 210 |
| 1.0 | 200 | 0.37 | 220 |
| 2.0 | 200 | 0.40 | 300 |

EXAMPLE 3

The procedure of Example 2 is followed in preparing a polymer of the following monomers in the proportions given:
  68 parts 2-ethylhexyl acrylate, 0.8 part acrylic acid (AA), 8 parts VCl$_2$ and 3.2 parts glycidyl methacrylate as the backbone on which is polymerized 18 parts VCl$_2$ and 2 parts MMA.

The resulting latex is sprayed onto a cotton pile fabric to provide an elastic backing and the film cured by heating at 120° C. for 10 minutes. The film has a thickness of about 5 mils and is characterized by good solvent resistance and aging properties. The latex is also useful as a binder for non-woven fabrics.

EXAMPLE 4

The procedure of Example 2 is followed in preparing a polymer of the following monomers in the proportions given:
  57 parts BA, 1.2 parts methacrylic acid (MAA) and 1.8 parts of a 50/50 mixture of 4-pentenamide, N-methylol-4-pentenamide as the backbone on which is polymerized 39.1 parts VCl$_2$, 0.5 part AA and 0.5 part BA.

The resulting latex is spun as in Example 1 and the resulting thread cured without any stretch applied. The fiber produced has a tensile strength of about 2,000 psi, an elongation of 450 percent, a set of 40 percent after an elongation of 400 percent and a return modulus of 30 for 100/400, 85 for 200/400 and 200 for 300/400.

EXAMPLE 5

The procedure of Example 2 is followed in preparing a polymer of the following monomers in the proportions given:

62.3 parts BA, 7 parts MMA, 0.28 part AAm and 0.42 part N–MlAm as the backbone on which is polymerized 29.7 parts VCl$_2$ and 0.3 part EA.

The resulting emulsion is spun as in Example 1 except that the coagulating bath is a 9 percent aqueous HCl solution saturated with NaCl. The amount of stretch applied to each fiber during curing and the properties of the fibers produced are shown in Table III:

TABLE III

| Stretch cure | Tenacity | Elongation |
|---|---|---|
| 0 | 0.13 | 520 |
| 100 | 0.23 | 380 |
| 200 | 0.30 | 270 |
| 250 | 0.34 | 230 |

EXAMPLE 6

The procedure of Example 2 is followed in preparing a polymer of the following monomers in the proportions given:
60 parts BA, 18.4 parts AN, 0.7 part MAM and 0.9 part MlMAM as the backbone on which is polymerized 19.8 parts VCl$_2$ and 0.2 part BA.

The latex so produced is sprayed onto Bonderite 100 steel panels and cured as in Example 3. The resulting cured film is characterized by good solvent resistance and weathering properties. The film is tough and possesses good abrasion resistance. The film can also be used as a prime coat for hard surface coatings such as MMA-based coatings.

Example 7

A solution is prepared of 5 parts of the sodium salt of a branched alkyl sulfate (25 percent solids), 5 parts of the NaAAPS (27 percent solids) and 140 parts of water. A mixture of 61.6 parts of BA, 7 parts of AN and 1.4 parts of MAM is added with stirring. The resulting mixture is cooled to 25° C. by means of a constant temperature bath and this cooling and stirring and a nitrogen atmosphere are maintained throughout the reaction. After thorough deoxygenation, 0.35 part of APS in 1 part of water and 0.014 part of SFS in 0.5 part of water are added. In a short time, the temperature climbs to 48° C. When the temperature falls to 45° C., an additional 0.5 part of APS and 0.014 part of SFS are added as before. The conversion as determined by solids is 98+percent after 4 hours at which time the latex is cooled to 20° C. and a mixture of 60 parts water, 29.7 parts VCl$_2$ and 0.3 part EA is added. After 15 minutes, 0.1 part of APS in 1 part of water, 0.06 part of SFS in 3 parts of water, and 0.03 part of p-methane hydroperoxide are added. The temperature rises and is held to a maximum of 30° C. and after 1 hour the mixture is filtered through cheesecloth and stored. Conversion as determined by a solids determination is 98–99 percent of theory.

To this emulsion is added 0.7 part of formaldehyde per 100 parts of polymer solids and it is allowed to mature for 2 days. The emulsion after the maturing period is spun as in Example 1. The collector is run at a linear rate 3 times as great as the belt so that a stretch of 200 percent is applied to the fiber. The bobbin is removed from the collector, the fiber end is taped to the bobbin and the bobbin is placed in a forced draft oven held at 100° C. for 1 hour to complete the cure. The fiber has the following properties: Tenacity 0.45 g/den., elongation 275 percent and return modulus at 100 percent from 200 percent of 0.02 g/den.

EXAMPLES 8–10

The procedure of Example 7 is repeated with the following exceptions:
EXAMPLE 8: The spin bath is changed to 10 percent HCl saturated with NaCl;
EXAMPLE 9: The spin bath is made up of saturated NaCl;
EXAMPLE 10: The formaldehyde is omitted from the emulsion and the spin bath composition is concentrated HCl with 10 percent formaldehyde added.

An elastomeric fiber possessing good modulus and tensile strength with excellent resistance to chlorine bleaches and ultraviolet light is obtained in each case.

The properties of the fiber can be controlled by the composition, the time and temperature of precure and the amount of stretch applied before the final cure.

EXAMPLES 11 and 12

For Example 11, the procedure of Example 2 is followed in preparing a polymer of the following monomers in the proportions given:
63 parts BA, 5.6 parts AN, 0.56 part MAM and 0.84 part MlMAM as the backbone on which is polymerized 29 parts VCl$_2$, 0.5 part BA and 0.5 part AA.

For Example 12, the procedure of Example 1 is followed in preparing a polymer of the following monomers in the proportions given:
56.3 parts BA, 6.5 parts VCl$_2$, 0.93 part AA, 0.56 part MAM and 0.74 part MlMAM as the backbone on which is polymerized 33.8 parts VCl$_2$, 0.58 part BA and 0.58 part AA.

The latexes produced by this means are spun as in Example 1 and one lot cured while not under tension and a second lot stretch-cured. The density of the fiber of Example 11 is 1.21 and that of Example 12 is 1.32. The properties of the four fibers so produced are compared to the properties of a commercial natural rubber fiber, a commercial spandex fiber, and three different acrylic rubbers in Table IV:

TABLE IV

| Fiber | Stretch cure | Elongation | Tensile | Return modulus 100/400 | 200/400 | 300/400 | Running set |
|---|---|---|---|---|---|---|---|
| Example: | | | | | | | |
| 11 | 0 | 407 | 3,200 | 60 | 120 | 260 | 38/400 |
| 12 | 0 | 440 | 2,420 | 25 | 75 | 200 | 70/400 |
| Spandex | | 550 | 8,000 | 96 | 120 | 252 | 85/400 |
| Natural rubber | | 600 | 3,500 | 104 | 145 | 188 | 5/400 |
| Commercial acrylate rubber [a] | | 310 | 1,850 | | | | |
| Experimental acrylate rubber [b] | | 560 | 1,390 | | | | |
| Experimental acrylate rubber [c] | | 700 | 1,600 | | | | |
| | | | | 50/200 | 100/200 | 150/200 | |
| Example: | | | | | | | |
| 11 | 200 | 205 | 4,760 | 90 | 175 | 396 | 12/200 |
| 12 | 200 | 230 | 6,760 | 54 | 143 | 412 | 20/200 |

[a] Available under the trademark "Thiacril 44." Data from a commercial bulletin on Thiacril 44 compounded with 40 phr. FEF carbon black, 1 phr. stearic acid, 1.5 phr. triethylenetetramine, 2.0 phr. 2,2'-benzothiazyl disulfide, cured 30 minutes at 310° F. and tempered 24 hours at 300° F.
[b] A BA/AN (90/10) copolymer loaded with 40 phr. of poly(ethyl methacrylate) cast from latex. Data from U.S. 4,820,718 to Fram et al.
[c] Data for a BA/MMA/MAM polymer compounded with 40 phr. poly(ethyl methacrylate) and a two molar excess of formaldehyde and cured one hour at 100° C. Data from Leonard Nelson and Brandes, Inc. & Eng. Chem., 50, 1053 (1958).

The fiber of Example 12 and the commercial spandex fiber used as the control are then compared:

a. UV Stability

On exposure to a carbon arc light the fiber of Example 12 loses tenacity at a linear rate according to the duration of exposure while the spandex fiber at first is but little affected, but then weakens more rapidly so that after some 32 hours exposure, the spandex fiber loses more tenacity than the fiber of Example 12. Both fibers show negligible discoloration.

b. Hypochlorite bleach

Both fibers are then tested for the effect of commercial sodium hypochlorite bleach. The manufacturer of this product recommends a concentration of 0.3 to 0.5 percent by weight for normal domestic use. The spandex fiber turns a bright yellow-orange while the fiber of the invention shows no discoloration. The percent changes of tenacity and elongation as a percent of the original value are shown in Table V:

TABLE V

| Bleach, percent | Temperature, °F. | Time, hours | Example 12 | | Spandex | |
|---|---|---|---|---|---|---|
| | | | Tenacity change | Change in elongation | Tenacity change | Change in elongation |
| 0.1 | 77 | 1 | +1 | +1 | −16 | −7 |
| | | 10 | +2 | +13 | −74 | |
| 0.1 | 149 | 1 | −7 | +15 | −56 | −11 |
| | | 10 | −5 | +18 | −100 | |
| 1.0 | 77 | 1 | −9 | +0 | −21 | −5 |
| | | 10 | +3 | +4 | −90 | −66 |
| 1.0 | 149 | 1 | −6 | +6 | −73 | −7 |
| | | 10 | −8 | +9 | ¹ −100 | |

¹ Sample did not survive the treatment.

c. Chlorite and Peroxide Bleaches

The fibers are then tested for the effect of a 1 percent sodium chlorite solution after immersion for 1 hour at 200° F. and for the effect of a 5 percent hydrogen peroxide solution for 1 hour at 200° F. The change in elongation and tenacity as a percentage of the original is shown in Table VI:

TABLE VI

| | Sodium chlorite | | | Hydrogen peroxide | | |
|---|---|---|---|---|---|---|
| Fiber | Color | Loss in tenacity | Change in elongation | Color | Loss in tenacity | Change in elongation |
| Ex. 12 | No change. | −36 | 0 | No change. | −24 | 0 |
| Spandex | Bright orange | −92 | −55 | do | 0 | +16.5 | d. Bleach and Ultraviolet Cycling

The fibers are then cycled through immersion for 6 hours at 70° F. in a 1 percent solution of sodium hypochlorite, rinsed, dried and exposed for 16 hours to ultraviolet. The spandex fiber darkens as a result of the cycle, while the fiber of the invention shows negligible discoloration. The percent loss in tenacity of the fibers is shown in the following Table VII:

TABLE VII

| Fiber | Number of cycles | Loss in Tenacity |
|---|---|---|
| Ex. 12 | 1 | 14 |
| Ex. 12 | 2 | 30 |
| Spandex | 1 | 53 | e. Drycleanability

The fibers are then immersed in perchloroethylene for 30 minutes at 70° F. The change in tenacity and elongation as a percentage of the original value and the amount of swelling are shown in Table VIII:

TABLE VIII

| Fiber | Loss in Tenacity | Change in Breaking Elongation | Transverse Swelling in Solvent, 70°F. |
|---|---|---|---|
| Ex. 12 | −60 | −50 | 33% |
| Spandex | 3150 | −40 | 50% |
| Natural Rubber | 3180 | −90 | 77% | f. Carbonization

The fibers are then tested for resistance to the treatments used to carbonize wool. For this treatment, the fibers are first immersed for 10 minutes in a 5 percent by weight aqueous solution of sulphuric acid at 74° F. The fibers are then dried at 176° F. for 15 minutes and baked at 230° F. for 15 minutes. The properties of the fibers so treated are shown in Table IX:

TABLE IX

| Fiber | Loss in tenacity, percent | Change in elongation, percent | Shrinkage, percent | Change in return modulus,ᵃ percent |
|---|---|---|---|---|
| Example 12 | −18.8 | 0 | 11 | 0 |
| Spandex | −77 | −21 | 3 | −31 |

ᵃ Fiber extended to ½ of its breaking extension and then returned to 1/10 of its breaking extension.

The fiber of Example 12 shows no change in color or hand as the result of this treatment, while the spandex fiber shows a slight browning and feels dead, almost brittle.

EXAMPLE 13

The polymer of Example 11 is prepared except that 1 part of a 10 percent aqueous solution of APS and one part of a 4 percent aqueous solution of SFS are used in place of the initiator system of Example 11.

The emulsion is formed into a fiber by extrusion through a 10 mil internal diameter glass capillary immersed under the surface of a bath consisting of a saturated NaCl solution held at 58° C. The fiber so formed is removed from the bath, washed with water and cured for one hour at 100° C. The fiber so produced has an elongation of 310 percent, tensile strength of 1200 psi and recovers from stretching with less than 5 percent permanent set.

EXAMPLE 14

A fiber was prepared as in Example 11 except that a sodium hydroxide-potassium acid phthalate buffer is used to give the second stage of the polymerization a pH of about 4. The fiber is stretch-cured 200 percent as in Example 11. The resulting fiber has an elongation of 200–240 percent, a tenacity of about 0.65 and a return modulus of 0.033 g/d (75/100), 0.015 g/d (50/100) and 0.006 g/d (25/100). The set is 6 percent (200 percent).

EXAMPLES 15 and 16

For example 15, the procedure of Example 2 is followed in preparing a polymer of the following monomers in the proportions given:

63 parts BA, 5.6 parts AN, 0.56 part MAM, and 0.84 part M1MAM as the backbone on which is polymerized 29 parts VCl₂, 0.5 part BA and 0.5 part AA.

For Example 16, the procedure of Example 15 is followed in preparing a polymer of the same monomers except that the VCl₂, BA and AA are polymerized separately and the latex is then mechanically mixed with the backbone latex in the same proportions as in preparing the sequential copolymer.

The latexes produced by this means are spun as in Example 1 and cured for 60 minutes at 100° C. while stretched 250 percent. The properties of the fibers so produced are set forth in Table X:

TABLE X

| Ex. | Elongation | Tenacity | Return Modulus | Running Set |
|---|---|---|---|---|
| 15 | 271 | .40 | 0.008 (50/100) | 15 |
| 16 | 311 | .22 | .0055 (100/200) | 20 |

EXAMPLES 17 and 18

For these examples, the procedure of Example 16 is followed in preparing separate latexes of the backbone copolymer and reinforcing material which are then mechanically mixed. The latex of the backbone copolymer is prepared using the same monomers and process as in Example 16.

In Example 17, the reinforcing material is a commercial latex of a copolymer of 90 parts vinyl chloride and 10 parts diethyl maleate prepared with an anionic emulsifier and available under the trademark "PLIOVIC 300".

In Example 18, the latex of the reinforcing material is prepared as follows:

Into a glass-lined reactor are charged 90 grams of water containing 1.5 grams of SLS and 0.1 gram of ferrous sulfate. This is frozen and 50 grams of vinyl chloride monomer condensed in the reactor. The reactor is purged with nitrogen and sealed. It is then placed in a bath maintained at 2° C. and agitated. When the contents of the reactor have all melted, a charge consisting of 0.1 gram of potassium persulfate in 5 ml. of water and 0.1 gram of sodium bisulfite in 5 ml. of water is added. After 5 hours, the reactor is vented and the latex filtered. The conversion based on solids is about 94 percent. The solids content of the latex is 30.9 percent.

In each example, 30 parts by weight of solids of the reinforcing material are added to 70 parts by weight of the solids of the backbone material and the mixture stirred. The latexes produced by this means are spun as in Example 1. However, upon emerging from the wash bath the fibers are air-dried, cured 15 seconds at 100° C., then stretched 200 percent and cured at the temperature and time shown in Table XI followed by one-half hour at 65° C. and 16 hours at room temperature before being released from tension. The properties of the fibers so produced under the different curing conditions are set forth in Table XI wherein "T" is tenacity and "E" is elongation:

TABLE XI

| Example | 4 min./140° | | 3 min./150° | | 3 min./160° | | 2 min./170° | | 2 min./180° | |
|---|---|---|---|---|---|---|---|---|---|---|
| | T | E | T | E | T | E | T | E | T | E |
| 17 | .31 | 195 | .31 | 195 | .31 | 175 | .35 | 200 | .36 | 160 |
| 18 | .30 | 175 | .31 | 175 | .33 | 175 | .33 | 175 | .33 | 190 |

EXAMPLES 19–22

For these examples, the latex of the backbone copolymer is prepared using the same monomers and process as in Example 16. To 70 parts (solids) of the backbone are then added 30 parts (solids) of a latex prepared using the same polymerization procedure as in Example 16 but with the following monomers in the proportions given:

In Example 19, the monomers are 99 parts $VCl_2$ and 1 part EA;

In Example 20, the monomers are 97 parts $VCl_2$ and 3 parts EA;

In Example 21, the monomers are 94 parts $VCl_2$ and 6 parts EA;

In Example 22, the monomer consisted of $VCl_2$. The 70 parts of the backbone copolymer and 30 parts of the reinforcing copolymer are then mechanically mixed and the latexes produced by this means are spun and cured as in Examples 17 and 18. The properties of the fibers under the different curing conditions are set forth in Table XII wherein "T" is tenacity and "E" is elongation:

TABLE XII

| Example | 4 min./140° | | 3 min./150° | | 3 min./160° | | 2 min./170° | | 2 min./180° | |
|---|---|---|---|---|---|---|---|---|---|---|
| | T | E | T | E | T | E | T | E | T | E |
| 19 | .18 | 230 | .17 | 220 | .18 | 230 | .22 | 220 | .39 | 160 |
| 20 | .16 | 215 | .17 | 250 | .19 | 235 | .24 | 200 | .37 | 140 |
| 21 | .17 | 165 | .22 | 180 | .30 | 175 | .31 | 125 | .30 | 125 |
| 22 | .17 | 220 | .18 | 230 | .19 | 235 | .20 | 220 | .34 | 180 |

In addition, the fiber of Example 22 is heated at 200° C. for 1 minute. The fiber so treated has a tenacity of 0.40 and an elongation of 160.

EXAMPLE 23

A solution of 3 parts of the NaAAPS (27 percent solids) and 3 parts of the sodium salt of a branched alkyl sulfate in 300 parts of deoxygenated deionized water with 68.6 parts of a mixture of 504 parts of BA and 40.8 parts of AN and 1.4 parts of MAM is charged to a cooled, nitrogen-purged, reaction kettle equipped with a stirrer. After 15 minutes of stirring 1 part of a solution of 1 part of APS in 9 parts of water and 2 parts of a solution of 2 parts of SFS in 98 parts of water are added. In a short time an exotherm occurs and 1 hour after the exotherm peak an emulsified mixture of 100 parts of water, 15 parts of each of the surfactants used in the initial charge, 240.1 parts of the BA/AN mix previously prepared, 4 parts of 2-methyl-5-vinyl pyridine, 4.9 parts of MAM and 2 parts of 10 percent APS solution is added. After 15 minutes 4 parts of the 2 percent SFS solution are added and after 10–20 minutes an exotherm occurs. One hour after the exotherm peak a pre-emulsified mixture of 100 parts water, 4 parts of each of the previously used surfactants, 240.1 parts of the BA/AN mix, 4.9 parts of MAM and 2 parts of 10 percent APS is added. After 15 minutes 4 parts of 2 percent SFS solution added, an exotherm then occurs and stirring is continued for 3 hours. A chaser consisting of 8 parts of 2 percent SFS and 0.4 parts of t-BHP are added. After 3 hours, solids are 49.8 percent (98 percent of theory) and residual BA determined by means of gas liquid chromatography is less than 0.5 percent on polymer.

A pre-emulsified mixture of 200 parts of water, 15 parts of each of the surfactants, 240 parts of $VCl_2$, 1 part of 10 percent acetic acid, 0.4 part of t-BHP is added to the kettle and stirred 15 minutes then 8 parts of 2 percent SFS is added and stirring is maintained until 2 hours after the exotherm subsides, at which point the emulsion is ready for use.

The emulsion is filtered through a 5 micron filter pad and then 0.16 part per 100 parts polymer of the sodium salt of a formaldehyde-condensed naphthalene sulfonic acid (FNS), 2 parts of anatase dispersed in 3 parts of water per 100 parts polymer and 0.1 part of formaldehyde per 100 parts water are added to the dispersion. This is spun into 20 percent aqueous HCl, washed in an 0.1 percent solution formaldehyde to remove excess HCl. dried by infrared lamps while supported on a moving belt, then stretched 75 percent to a set of rolls held at 210° C. and sufficient laps are used to give a contact time of 30 seconds. The fiber is then lubricated with a 7 percent emulsion of 50 cps poly(methylsiloxane) oil in water and wound on a bobbin. The fiber has a tenacity of 0.42 g/den., an elongation of 400 percent and can be dyed to bright fast shades with acid dyes.

EXAMPLE 24

A solution containing 20 parts MAM, 0.002 parts of the methyl ether of hydroquinone, 20 parts of 0.9 percent sodium carbonate in water, and 0.98 part of 36 percent formaldehyde in 158.04 parts of water is prepared and heated at 50° C. for 1 hour. A mixture of 900 parts of BA and 80 parts of AN is also prepared.

To a nitrogen-purged resin kettle held at 30° C. is added 500 parts of water, 7 parts of the NaAAPS (27 percent solids), 7 parts of the sodium salt of a branched alkyl-sulfate (28 percent solids), 122.5 parts of the BA/AN mix, 25 parts of the MAM solution and 0.1 part of SFS dissolved in 4.9 parts of water. After 15 minutes of stirring 0.25 part of APS dissolved in 12.25 parts of water is injected and polymerization commences within 15 minutes.

The remainder of the BA/AN and MAM mixtures are emulsified in 211 parts of water with 29 parts of each of the previously used surfactants and 0.25 part of SFS. This is added at the rate of 217 parts per hour to the kettle starting 60 minutes after the initiation of polymerization of the first part. A mixture of 0.72 part of APS in 35.28 parts of water is added concurrently at the rate of 6 parts per hour. Two hours after the completion of the additions 0.2 part of SFS in 9.8 parts of water and 0.5 part of t-BHP are added and stirring is continued for 12 hours. At this time the residual monomer level by gas liquid chromatographic analysis is less than 0.4 percent on polymer.

The latex is cooled to 20° C. and an emulsified mixture of 340 parts of water, 18 parts of each of the previously used surfactants, 428.5 parts of $VCl_2$ and 14 parts of solution of 2 parts of SFS in 98 parts of water is added. After 15 minutes of stirring 1.4 parts of t-BHP is added and after 4 hours the conversion is 98 + percent by solids.

To 900 parts of the above emulsion is added 7.2 parts of a 10 percent solution of FNS and 22.5 parts of a 40 percent solids dispersion of anatase in water. The dispersion is then spun into 20 percent aqueous HCl, washed in a water bath to remove excess HCl, dried by infrared lamps while supported on a moving belt and stretched 75 percent to a set of canted rolls heated to 210° C. with 30 sec. contact time, then lubricated with the silicone oil emulsion of Example 23 and wound on a bobbin. The fiber has a tenacity of 0.42 g/den., an elongation of 370 percent and less than 5 percent permanent set after being elongated to 200 percent for 3 hours.

EXAMPLE 25

A high pressure reactor equipped with a stirrer, heat control system, ethylene pressurization system and two injector pumps is charged with 1,450 parts of water, 10 parts of a solution of 2.25 parts of sodium persulfate in 47.75 parts of water and 92.7 parts of a mixture of 450 parts of EA and 13.5 parts of MAM and 6.75 parts of sodium dodecyl benzene sulfonate. The reactor is closed, stirring begun and an ethylene (E) pressure of 5,000 psig applied while the temperature is raised to 60° C. After 1 hour at temperature the addition of the remainder of the EA/MAM mixture and sodium persulfate solution is begun at a rate which completes the addition in 3.5 hours. At the end of the addition the reactor is cooled and vented, the resulting emulsion is vacuum stripped to remove the residual EA. The polymer has a composition of 76.3/21.3/2.4 EA/E/MAM by C, H, N analysis.

To 542 parts of stripped emulsion (33.17 percent solids) is added a pre-emulsified mixture of 25 parts of a mixture of the NaAAPS and alkylsulfate (27.5 solids), 25 parts of water, 75 parts of $VCl_2$, 1.3 parts of EA and 2.6 parts of 4 percent SFS in water. After stirring for 15 minutes in a nitrogen atmosphere 0.26 part of t-BHP is added and an exotherm occurred. After 3 hours the emulsion is filtered and found to have a solids content of 37.7% (97 percent conversion of the monomers).

To 600 parts of the above emulsion is added 4.7 parts of a solution of 1 part of FNS in 9 parts of water, 15 parts of 37 percent formaldehyde solution and 4.8 parts of anatase dispersed in 7.2 parts of water. This mixture is allowed to age for 1 day at 72° F., then extruded through a 20 mil capillary into concentrated hydrochloric acid, washed, dried to 1 percent moisture, stretched 50 percent, heated to 200° C. on a set of canted rolls and finally lubricated with the silicone oil emulsion of Example 23 and wound on a bobbin.

The fiber has a tensile strength of 0.3 g/den., an elongation of 410 percent and a return modulus at 100 percent returning from 200 percent of 0.008 g/den. The material is slightly more rubbery than a polymer prepared from BA/AN 90/8 as evidenced by a higher return modulus at high rates of return.

EXAMPLE 26

A polymer emulsion is prepared as in Example 24 except that the BA/AN monomer mix used consists of 950 parts of BA and 30 parts of AN. The emulsion is treated and spun in the same manner as the emulsion of Example 24 to yield fiber with a tenacity of 0.40 g/den., an elongation of 390 percent and a return modulus of 0.009 g/den.

EXAMPLE 27

A fiber is prepared as above from an emulsion prepared using 980 grams of BA instead of the BA/AN monomer mix. The fiber has a tenacity of 0.37 g/den., an elongation of 400 percent and a return modulus of 0.008 g/den.

EXAMPLE 28

Using the procedure of Example 2 a backbone polymer of the following monomers in the proportions given is prepared:
  88 parts BA, 10 parts AN, 1.8 parts MAM, 0.2 parts methylolmethacrylamide.

A blend of 80 parts (solids) of the above latex and 20 parts (solids) of a commercial poly(vinylidene fluoride) dispersion is prepared and spun as in Example 1 except that after emerging from the wash bath sample A is air dried and cured for 5 minutes at 140° C., sample B is heated at 166° C. for 60 seconds after curing, and sample C is stretched 200 percent and heated at 166° C. for 60 seconds after curing followed by aging for 16 hours at room temperature before the tension is released. The properties of the fibers produced are set forth in Table XIII:

TABLE XIII

|  | Sample A | Sample B | Sample C |
|---|---|---|---|
| Tenacity (g./den.) | 0.08 | 0.25 | 0.23 |
| Elongation (%) | 900 | 605 | 475 |

In a like manner a poly(vinyl fluoride) reinforced fiber can be produced with similar properties.

We claim:
1. A synthetic elastomeric material comprising:
  A. About 50 to 90 percent by weight of a base elastomeric composition comprising:
    1. about 75 to 99.9 percent by weight of the backbone of at least one monomer polymerizable to give a rubbery polymer and selected from the group consisting of alkyl ($C_2$–$C_8$) acrylates and mixtures thereof with each other and with up to an equal weight amount of a monomer selected from the group consisting of ethylene, propylene and isobutylene; and
    2. at least about 0.1 percent by weight of the backbone of at least one unsaturated monomer copolymerizable with (A) (1) which is also effective to crosslink said backbone by a reaction which is activated separately from the polymerization reaction, said monomer selected from the group consisting of:
  a. monoethylenically unsaturated monomers containing at least one reactive group capable of undergoing a condensation reaction, said reactive group selected from the group consisting of amide, alcoholic hydroxyl, carboxylic acid, ureido and epoxy groups, and
  b. monomers containing a single terminal $\alpha,\beta$ carbon-to-carbon unsaturation and at least one vinylene group; and
B. About 50 to 10 percent by weight of a reinforcing material for the base elastomeric composition and dispersed throughout said base elastomeric composition consisting of a polymer of:
  1. at least one unsaturated halide monomer selected from the group consisting of vinylidene chloride, vinylidene fluoride, vinylidene fluorochloride, vinyl chloride and vinyl fluoride, and
  2. up to about 6 percent by weight of the mixture of at least one $\alpha,\beta$-monoethylenically unsaturated monomer copolymerizable with the unsaturated halide monomer;
the backbone being crosslinked to solvent-resistant condition by virtue of the reaction of (A)(2) subsequent to formation of said dispersion of said reinforcing material in said base elastomeric composition.

2. A synthetic elastomeric material according to claim 1 wherein the monomer polymerizable to give a rubbery polymer is ethyl acrylate or n-butyl acrylate and the backbone copolymer contains up to about 20 percent by weight of the backbone copolymer of at least one $\alpha,\beta$-monoethylenically unsaturated monomer whose homopolymer is hard and non-elastic at 50° C. to increase the glass transition temperature of the copolymer.

3. A synthetic elastomeric material according to claim 2 wherein (B)(1) as defined in claim 1 is vinylidene chloride.

4. A synthetic elastomeric material according to claim 2 wherein (B)(1) as defined in claim 1 is vinyl chloride.

5. A synthetic elastomeric material comprising:
A. About 50 to 90 percent by weight of a base elastomeric composition comprising:
  1. about 75 to 99.9 percent by weight of the backbone of at least one monomer polymerizable to give a rubbery polymer and selected from the group consisting of alkyl ($C_2-C_8$) acrylates and mixtures thereof with each other and with up to an equal weight amount of a monomer selected from the group consisting of ethylene, propylene and isobutylene; and
  2. at least about 0.1 percent by weight of the backbone of at least one unsaturated monomer copolymerizable with (A)(1) which is also effective to crosslink said backbone by a reaction which is activated separately from the polymerization reaction, said monomer selected from the group consisting of:
    a. monoethylenically unsaturated monomers containing at least one reactive group capable of undergoing a condensation reaction, said reactive group selected from the group consisting of amide, alcoholic hydroxyl, carboxylic acid, ureido and epoxy groups, and
    b. monomers containing a single terminal $\alpha,\beta$ carbon-to-carbon unsaturation and at least one vinylene group; and
B. About 50 to 10 percent by weight of a reinforcing material for the base elastomeric composition and dispersed throughout said base elastomeric composition consisting of a polymer of:
  1. either vinylidene chloride or vinylidene fluoride and
  2. up to about 6 percent by weight of (B) of at least one $\alpha,\beta$-monoethylenically unsaturated monomer copolymerizable with (B)(1).

6. A sequential copolymer comprising:
A. About 50 to 90 percent by weight of a backbone formed of a copolymer comprising:
  1. about 75–99.9 percent by weight of the backbone of at least one monomer polymerizable to give a rubbery polymer and selected from the group consisting of alkyl ($C_2-C_8$) acrylates and mixtures thereof with each other and with up to an equal weight amount of a monomer selected from the group consisting of ethylene, propylene and isobutylene; and
  2. at least about 0.1 percent by weight of the backbone of at least one $\alpha,\beta$-monoethylenically unsaturated monomer copolymerizable with (A)(1) which contains at least one reactive group capable of undergoing a condensation reaction to crosslink said backbone, said reactive group selected from the group consisting of amide, alcoholic hydroxyl, carboxylic acid, ureido and epoxy groups; and
B. About 50 to 10 percent by weight of a subsequently formed polymeric component obtained by polymerization in an aqueous dispersion of the backbone of:
  1. at least one unsaturated halide monomer selected from the group consisting of vinylidene chloride, vinylidene fluoride, vinylidene fluorochloride, vinyl chloride, and vinyl fluoride; and
  2. up to 6 percent by weight of the mixture of at least one $\alpha,\beta$-monoethylenically unsaturated monomer copolymerizable with the unsaturated halide monomer.

7. A sequential copolymer according to claim 6 wherein the backbone copolymer contains up to about 20 percent by weight of the backbone copolymer of at least one $\alpha,\beta$-monoethylenically unsaturated monomer whose homopolymer is hard and non-elastic at 50° C. to increase the glass transition temperature of the copolymer.

8. A sequential copolymer according to claim 7 wherein the unsaturated halide monomer (B)(1) as defined in claim 6 is vinylidene chloride.

9. A sequential copolymer comprising:
A. About 60 to 80 percent of a backbone formed of a copolymer comprising from about 0.1 to 5 percent by weight of the backbone of at least one $\alpha,\beta$-monoethylenically unsaturated monomer which contains at least one reactive group capable of undergoing a condensation reaction to crosslink said backbone, said reactive group selected from the group consisting of amide, alcoholic hydroxyl, carboxylic acid, ureido and epoxy groups, up to about 15 percent by weight of the backbone of at least one $\alpha,\beta$-monoethylenically unsaturated monomer whose homopolymer is hard and non-elastic at 50° C. to increase the glass transition temperature of the backbone, and at least one monomer selected from the group consisting of n-butyl acrylate, i-butyl acrylate, i-propyl acrylate, n-propyl acrylate, ethyl acrylate and mixtures of one or more of the foregoing with up to an equal weight amount of ethylene; and
B. About 40 to 20 percent by weight of a subsequently formed polymeric component obtained by polymerization in aqueous dispersion of the backbone of:
  1. either vinylidene chloride or vinyl chloride; and
  2. up to 6 percent by weight of (B) of at least one $\alpha,\beta$-monoethylenically unsaturated monomer copolymerizable with (B)(1).

10. A copolymer according to claim 9 where (B)(1) is vinylidene chloride.

11. A copolymer according to claim 10 wherein the monomer to increase the glass transition temperature of the backbone copolymer as defined in claim 9 is selected from the group consisting of vinylidene chloride, vinyl chloride, acrylonitrile, vinyl pyridine, methacrylonitrile, methyl methacrylate, styrene, vinyl toluene and ethyl methacrylate.

12. A copolymer according to claim 10 wherein the reactive group to crosslink said backbone as defined in claim 9 is amide.

13. A copolymer according to claim 10 wherein the acrylate monomer of the group specified in claim 9 is butyl acrylate.

14. A copolymer according to claim 10 wherein the acrylate monomer of the group specified in claim 9 is butyl acrylate, and the monomer to increase the glass transition temperature as defined in claim 9 is acrylonitrile.

15. A process for producing an elastomeric sequential copolymer comprising:
  A. In the presence of an effective amount of a free radical catalyst, polymerizing an emulsion of:
    1. about 75 to 99.9 percent by weight of at least one monomer polymerizable to give a rubbery polymer and selected from the group consisting of alkyl ($C_2$–$C_8$) acrylates and mixtures thereof with each other and with up to an equal weight amount of a monomer selected from the group consisting of ethylene, propylene and isobutylene with
    2. at least about 0.1 percent by weight of at least one, $\alpha,\beta$-monoethylenically unsaturated monomer copolymerizable with (A)(1) which contains at least one reactive group capable of undergoing a condensation reaction to crosslink the copolymer, said reactive group selected from the group consisting of amide, alcoholic hydroxyl, carboxylic acid, ureido and epoxy groups to produce a latex of a backbone copolymer;
  B. Adding to said latex
    1. at least one unsaturated halide monomer selected from the group consisting of vinylidene chloride, vinylidene fluoride, vinylidene fluorochloride, vinyl chloride and vinyl fluoride, and
    2. up to 6 percent by weight of the mixture of at least one $\alpha,\beta$-monoethylenically unsaturated monomer copolymerizable with the unsaturated halide monomer; and
  C. Polymerizing the added monomeric material on the backbone copolymer in the presence of an effective amount of a free radical catalyst, the backbone copolymer constituting from about 50 to 90 percent by weight of the total polymer.

16. A process for producing an elastomeric sequential copolymer comprising:
  A. In the presence of an effective amount of a free radical catalyst polymerizing an emulsion of
    1. about 0.1 to 5 percent by weight of at least one $\alpha,\beta$-monoethylenically unsaturated monomer which contains at least one reactive group capable of undergoing a condensation reaction to crosslink polymer chains containing said monomer units, said reactive group selected from the group consisting of amide, alcoholic hydroxyl, carboxylic acid, ureido and epoxy groups;
    2. up to about 15 percent by weight of at least one $\alpha,\beta$-monoethylenically unsaturated monomer whose homopolymer is hard and non-elastic at 50° C. to increase the glass transition temperature of the copolymer;
    3. at least one monomer selected from the group consisting of n-butyl acrylate, i-butyl acrylate, i-propyl acrylate, n-propyl acrylate, ethyl acrylate, and mixtures of one or more of the foregoing with up to an equal weight amount of ethylene, thereby producing a latex of a backbone copolymer;
  B. Adding to said latex
    1. either vinylidene chloride or vinyl chloride, and
    2. up to 6 percent by weight of (B) of at least one $\alpha,\beta$-monoethylenically unsaturated monomer copolymerizable with (B)(1); and
  C. Polymerizing the added monomeric material on the backbone copolymer in the presence of an effective amount of a free radical catalyst, the backbone copolymer constituting from about 60 to 70 percent by weight of the total polymer.

17. A process according to claim 16 wherein the monomer effective to increase the glass transition temperature of the backbone copolymer is selected from the group consisting of vinylidene chloride, vinyl chloride, acrylonitrile, vinyl pyridine, methacrylonitrile, methyl methacrylate, styrene, vinyl toluene and ethyl methacrylate and (B)(1) is vinylidene chloride.

18. A process according to claim 17 wherein the monomer (A)(1) as defined in claim 16 contains an amide group.

19. A process according to claim 17 wherein said emulsion contains an anionic emulsifier and the pH of the latex is maintained within the range of from about 3.5 to 6.5 during polymerization of the monomeric mixture on the backbone copolymer.

20. An elastomeric fiber comprising a crosslinked backbone copolymer of at least one monomer polymerizable to give a rubbery polymer and selected from the group consisting of alkyl ($C_2$–$C_8$) acrylates and mixtures thereof with each other and with up to an equal weight amount of a monomer selected from the group consisting of ethylene, propylene and isobutylene, said backbone having subsequently polymerized thereon at least one unsaturated halide monomer selected from the group consisting of vinylidene chloride, vinylidene fluoride, vinylidene fluorochloride, vinyl chloride and vinyl fluoride and up to 6 percent by weight of at least one $\alpha,\beta$-monoethylenically unsaturated monomer copolymerizable with said unsaturated halide, the backbone copolymer constituting from about 50 to 90 percent by weight of the total polymeric content of the fiber and being crosslinked by a condensation reaction of from about 0.1 to 5 percent of the monomer units of the backbone.

21. An elastomeric fiber comprising a crosslinked backbone copolymer of at least one monomer selected from the group consisting of ethyl acrylate, i-propyl acrylate, n-propyl acrylate, i-butyl acrylate and n-butyl acrylate and mixtures thereof with up to an equal weight amount of ethylene and with up to about 15 percent by weight of at least one $\alpha,\beta$-monoethylenically unsaturated monomer whose homopolymer is hard and non-elastic at 50° C. to increase the glass transition temperature of the backbone copolymer, said backbone copolymer having subsequently polymerized thereon either vinylidene chloride or vinyl chloride with up to 6 percent by weight of the vinylidene chloride or vinyl chloride of at least one $\alpha,\beta$-monoethylenically unsaturated monomer copolymerizable therewith, the backbone copolymer constituting from about 60 to 80 percent by weight of the total polymeric content of the fiber and being crosslinked by a condensation reaction of from about 0.1 to 5 percent of the monomer units of the backbone through a reactive group selected from the group consisting of amide, alcoholic hydroxyl, carboxylic acid, ureido and epoxy groups.

22. A fiber according to claim 21 wherein the monomer effective to increase the glass transition temperature of the backbone copolymer is selected from the group consisting of vinylidene chloride, vinyl chloride, acrylonitrile, vinyl pyridine, methacrylonitrile, methyl methacrylate, styrene, vinyl toluene and ethyl methacrylate and the monomeric material subsequently polymerized on the backbone is vinylidene chloride with up to 6 percent by weight of at least one $\alpha,\beta$-monoethylenically unsaturated monomer.

23. A fiber according to claim 22 which is characterized by approximately anisotropic swelling in the presence of a swelling solvent.

* * * * *